Patented July 14, 1942

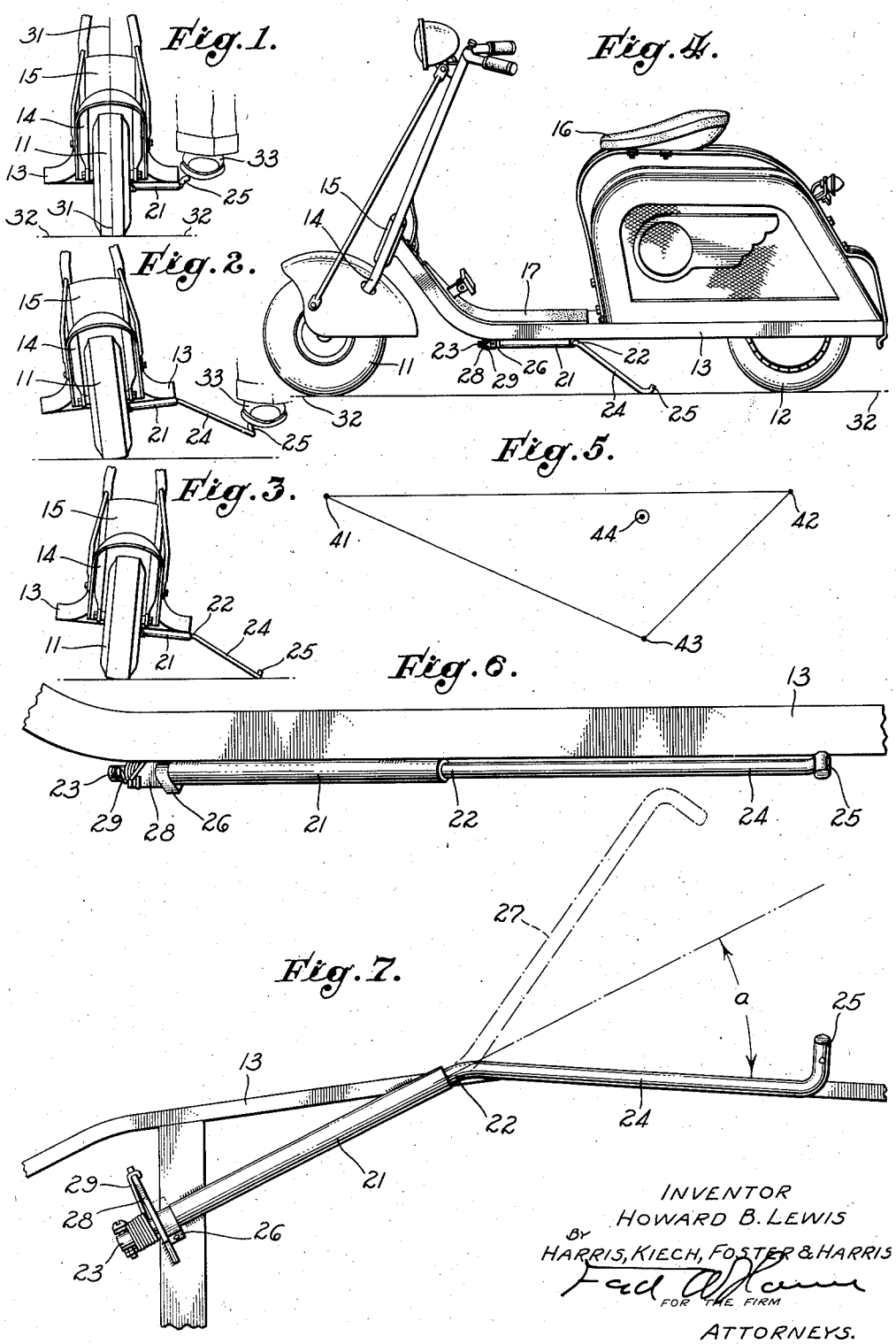
July 14, 1942.  H. B. LEWIS  2,289,661
PARKING STAND FOR VEHICLES
Filed April 7, 1941
INVENTOR
HOWARD B. LEWIS
BY HARRIS, KIECH, FOSTER & HARRIS
FOR THE FIRM
ATTORNEYS.

2,289,661

UNITED STATES PATENT OFFICE 2,289,661

PARKING STAND FOR VEHICLES

Howard B. Lewis, Venice, Calif., assignor to Salsbury Corporation, Los Angeles, Calif., a corporation of California Application April 7, 1941, Serial No. 387,206

1 Claim. (Cl. 280—293)

My invention relates to vehicles having two wheels which are placed in tandem and which normally rotate in the same plane, hereinafter called the central plane of the vehicle. A bicycle is an example of such a vehicle. When the bicycle is perpendicular and moving in a straight line, the central plane is perpendicular to any flat horizontal surface upon which the bicycle travels and both wheels rotate in this plane, the axis of each wheel being perpendicular to this plane.

My invention cannot very well be applied to bicycles or motor cycles of the ordinary type due to constructional difficulties, and it was designed to be used on small two-wheeled motor vehicles of a type to be hereinafter described. Such vehicles have no inherent stability when at rest and it is an object of my invention to provide a parking stand which will support the vehicle in an upright, but slightly leaning, position when the vehicle is at rest.

Further objects and advantages will be made evident hereinafter.

Referring to the drawing, which is for illustrative purposes only:

Figs. 1, 2, and 3 are diagrammatic views showing how the parking stand operates;

Fig. 4 is a side view of a motor vehicle using my invention, this view showing the parking stand in its extended position;

Fig. 5 is a diagram showing how the parking stand supports the vehicle;

Fig. 6 is a side elevation showing how my invention is applied to the vehicle; and Fig. 7 is a plan view as seen from below of the mechanism shown in Fig. 6.

This invention has a special utility when used on vehicles such as are shown in Fig. 4 in which 11 is a front wheel, 12 is a rear wheel, and 13 is a frame on which the shaft of the rear wheel 12 is journalled. The front wheel 11 is carried in a fork 14 which is journalled in an extension 15 of the frame 13. The rider sits on a cushion 16 and places his feet on a platform 17. The vehicle is supplied with an engine and transmission, not shown, through which the rear wheel is driven.

Vehicles of this type are now rather common and fill a field between the bicycle and the motorcycle. They are quite stable when in motion and can be readily stabilized by one leg of the rider when he is sitting on the cushion 16. It is, however, desirable that they can be parked in an upright position when not in use, and for that purpose I provide the parking stand embodying this invention.

This parking stand is illustrated in detail in Figs. 6 and 7. As shown therein, it consists of a tube or bearing 21 which is welded or otherwise rigidly secured to the bottom of the frame 13. Turning freely in the bearing 21 is a shaft 22, one end 23 of which projects from the bearing 21 and the other end of which is bent to form a leg 24. This leg has a bent end 25 which projects outwardly beyond the frame 13 when the leg 24 is in its retracted position, as shown in Fig. 6 and Fig. 7. The leg 24 and shaft 22 are formed of a single piece of cylindrical metal rod which is bent at the junction of the shaft 22 and leg 24 about as shown. The angle (a) shown in Fig. 7 may be about 30° and the parts are preferably assembled so that the leg 24 is below and substantially parallel to the edge of the frame 13 when the leg 24 is in its retracted position. A stop 26 is rigidly secured on the shaft 22 near the end 23 for the purpose of stopping further rotation of the shaft 22 when the leg is in its extended position, as shown in dotted lines 27 in Fig. 7. A disc 28 is welded to the frame and is engaged by a torsion spring 29, the other end of which is secured to the end 23 of the shaft 22 in such a manner as to rotate the shaft 22 to move the leg 24 from its extended position 27 into its retracted position, as shown in Fig. 6.

The method of operation of my invention can be better understood from an inspection of Figs. 1, 2, and 3. In Fig. 1 the rider has dismounted from the vehicle, the central plane of which is indicated by the line 31—31. This plane is perpendicular to the flat surface 32—32 upon which the wheels 11 and 12 of the vehicle rest. If now the rider pushes the top of the vehicle away from him so that it is inclined as shown in Fig. 2 and presses downwardly with his foot 33 on the end 25, the leg 24 moves down into the position shown in Fig. 2, and if the rider then pulls the top of the vehicle toward him into the position shown in Fig. 3, the leg 24 stays in the position shown in that figure. Referring to Fig. 5, which is a plan view of the surface 32—32, the wheels 11 and 12 rest on the points 41 and 42, the leg 24 rests on the point 43, and the center of gravity of the vehicle is over the point 44 and within the base defined by the triangle 41—42—43—41. The vehicle is therefore supported in stable equilibrium on the tripod represented by the points 41, 42, and 43, and may be left in an upright but inclined position, as shown in Fig. 3.

If the operator desires to release the parking stand, he pushes the top of the vehicle away from him until it is inclined as shown in Fig. 2, and the spring 29 snaps the leg 24 back into the retracted position shown in Fig. 1.

I claim as my invention:

In a vehicle having two wheels each normally rotatable about a horizontal axis, a frame comprising side members and a transverse member connecting said side members together, and a parking stand for supporting said vehicle in a substantially upright position when at rest, comprising: an elongated tubular bearing rigidly welded at one end to the underside of a side member and rigidly welded at its opposite end to the underside of said transverse member, a shaft rotatable in said bearing, said shaft having a leg extending at an angle from one end thereof and terminating in a lateral member engageable by the foot of the rider, a lug carried at the opposite end of said shaft arranged to engage with said transverse frame member to limit the angular rotation of said shaft relative to said transverse frame member when said leg is moved downwardly by said rider to its fully extended position wherein the lateral member at the end of said leg engages the ground, an element rigid with said transverse frame member, said lug being disposed between said element and one end of said tubular bearing to thereby prevent substantial longitudinal movement of said shaft relative to said tubular bearing, and a spring operatively arranged between said shaft and element tending to rotate said shaft to return said leg from its extended to its retracted position, said leg being arranged so that it is prevented solely by the weight of the vehicle from returning from its extended parking position to its retracted position.

HOWARD B. LEWIS.